Oct. 20, 1953  A. MAZZOLA  2,655,871
TRACTOR
Filed July 16, 1949  2 Sheets-Sheet 1

INVENTOR.
AMBROSE MAZZOLA
BY HIS ATTORNEYS.
HARRIS, KIECH, FOSTER & HARRIS
BY

Oct. 20, 1953     A. MAZZOLA     2,655,871
TRACTOR
Filed July 16, 1949     2 Sheets-Sheet 2
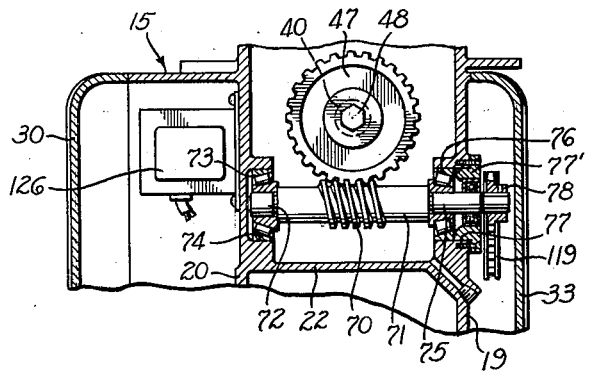
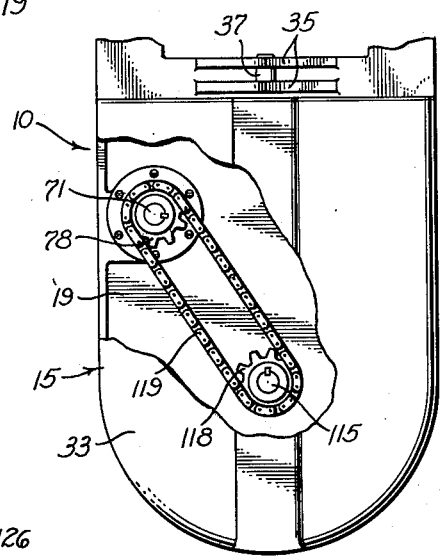
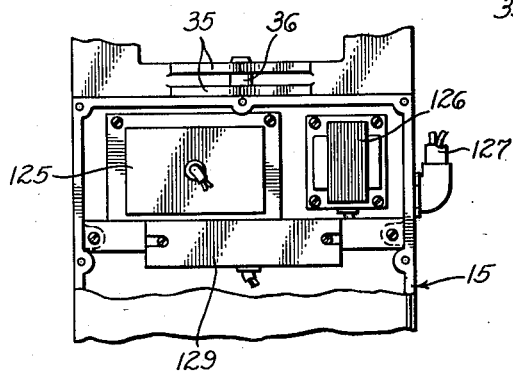
INVENTOR.
AMBROSE MAZZOLA
BY HIS ATTORNEYS.
HARRIS, KIECH, FOSTER & HARRIS

Patented Oct. 20, 1953                                                                            2,655,871

UNITED STATES PATENT OFFICE 2,655,871

TRACTOR

Ambrose Mazzola, Southgate, Calif., assignor to
Angelus Engineering Corporation, Maywood,
Calif., a corporation of California Application July 16, 1949, Serial No. 105,193

7 Claims. (Cl. 105—30)

This invention relates generally to tractors adapted for movement along a track and capable of pulling and pushing carriers along said track, and more particularly to a tractor which is travelable along an overhead monorail and adapted to move cranes and other tramrail equipment therealong.

One object of the invention is to provide a tractor of the character referred to which is especially simple in construction and highly efficient in operation.

Another object is to provide a tractor of this type which includes resilient tractor wheel means engageable with the monorail, an electric motor, a fluid coupling operated by the motor, and driving means between the coupling and said traction wheel means for rotating the latter. By this arrangement, a powerful, efficient tractor unit is provided and smooth, quiet operation is assured.

Another important object is to provide a tramrail tractor unit which has a one piece housing for enclosing the operating elements, thus greatly simplifying the structure and minimizing the manufacturing cost of the unit. A related object is to provide a novel means for mounting the operating elements within the one piece housing in a manner such that the electric driving motor, the fluid coupling and associated parts can be readily installed within and removed from the housing as a unit. By this provision, these parts can be assembled in a subassembly operation and thereafter installed in the housing, the subassembly being easily removed for inspection and servicing. Moreover, this arrangement of parts results in a compact, self contained unit which is considerably smaller than prior monorail tractors of this general character.

Another object is to provide a novel and unique means for assembling and mounting an electric driving motor in a one piece housing, said means including a cup-shaped holder or casing having a bearing in its end wall, the stator of the motor being receivable in the casing and keyed against rotation therein, and the rotor of the motor being carried by a shaft rotatable in the bearing and projecting therefrom to serve as a drive shaft, said shaft having an enlarged portion adjacent its rotor supporting end and abutting one side of the bearing, and a split ring engageable in a peripheral groove of the shaft and disposed against the other side of the bearing, said enlarged portion and said ring together retaining the rotor and its shaft in position and taking the axial thrust in both directions. By this construction, the components of the electric motor can be quickly assembled in and removed from the holder or casing and this makes for economy of manufacture and greatly facilitates servicing the power unit. Moreover, by this construction it is possible to utilize stators and rotors of various sizes to readily obtain a motor having the required power and characteristics. In accordance with the invention, the cup-shaped motor casing has a peripheral flange capable of being readily secured to a partition within the main housing of the tractor so that the entire motor assembly can be quickly installed and removed.

Another object of the invention is to provide traction wheels for mounting the tractor for movement along an overhead monorail, the tractor having a single wheel preferably, although not necessarily, provided with a resilient tire engageable against the lower side of the monorail, and a pair of wheels engageable against the upper side of the rail or track. A related object is to provide means for adjusting the upper wheels toward and away from the lower wheel so as to obtain the gripping action necessary to cause the tractor to move along the track when the lower wheel is rotated. By this adjusting means, the position of the upper wheels can be varied for the purpose of leveling the tractor, particularly in a plane normal to the monorail. As a further object and feature of the present invention, the upper wheels are rotatable at the ends of arms pivoted to the housing, the arms being so mounted that they can be readily removed and replaced by other arms of different widths so as to space the upper wheels in accordance with monorails of different sizes.

Further objects of the invention will become apparent from the following description of the tractor and from the drawings, which are for the purpose of illustration only, and in which:

Fig. 4 is a vertical sectional view, taken on line 4—4 of Fig. 3;

Fig. 5 is a sectional view, taken on line 5—5 of Fig. 2; and

Fig. 6 is a sectional view, taken on line 6—6 of Fig. 2.

Figure 3:
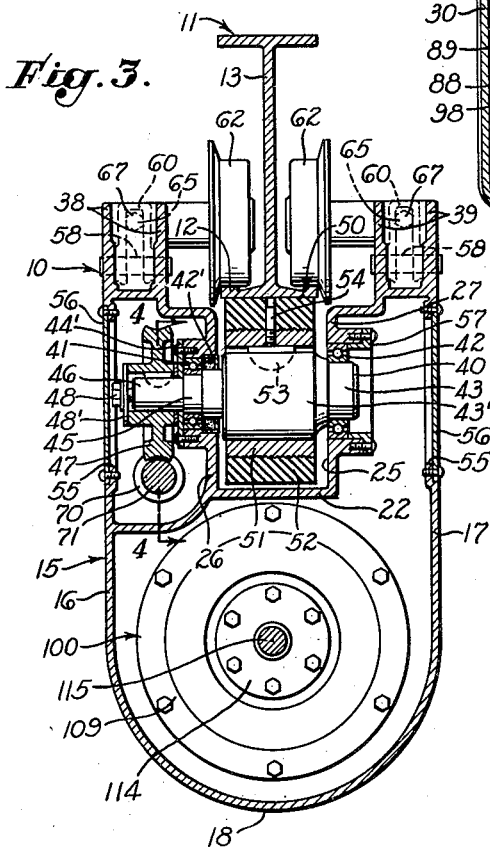
Fig. 3 is an enlarged cross-sectional view, taken on line 3—3 of Fig. 1.

Referring to the drawings in detail, my improved tractor 10 is designed for the purpose of traveling along a track 11 which may be a monorail in the form of an I-beam section and having a lower flange 12 at the lower end of its central web 13 (Fig. 3). The tractor 10 includes a one piece housing 15 which preferably is made as a casting but which may, if desired, be constructed by other suitable methods. The housing 15 has a front wall 16, a rear wall 17, a curved bottom wall 18 and an end wall 19, the end of the housing opposite the end wall 19 being open. The housing 15 has a vertical partition 20 which is provided with a circular opening 21 in its lower portion. A horizontal wall 22 extends between the partition 20 and the end wall 19. By this construction, the partition 20 and the horizontal wall 22 divide the housing 15 into a forward compartment 23, a rearward compartment 24 and a wall-like compartment 25 having an open upper end and provided with end walls 26 and 27 (Fig. 3). The open forward end of the housing 15 is normally closed by a dish-shaped cover 30 which is secured to the housing by screws 31. Fastened against the end wall 19 of the housing by screws 32 is a similar cover 33 which defines, with said end wall, a casing for enclosing driving means, to be later described. At its upper end, the housing 15 has a pair of vertically spaced, horizontal ears 35 adjacent each end, pins 36 and 37 extending between the ears providing means by which the tractor can be coupled to any tramrail unit which it is desired to pull or push along the monorail 11. The housing 15 also has two pairs of transversely spaced, longitudinally extending, upstanding flanges 38 and 39 at its upper end.

The walls 26 and 27 of the well-like portion of the housing 15 have bearing bosses which are provided with aligned bores. A wheel shaft 40 is adapted to rotate in anti-friction bearings 41 and 42 disposed in the bores of the respective walls 26 and 27 (Fig. 3). The shaft 40 has a reduced end 43 disposed in the bearing 42, with a shoulder of the shaft abutting the inner side of the bearing. A reduced portion 45 of the shaft 40 is located in the bearing 41, a shoulder of the shaft abutting the inner side of this bearing. The end 46 of the wheel shaft 40 which projects forwardly from the bearing 41 is further reduced to receive a worm wheel 47 which is keyed thereto and held axially in place by a bolt 48 screwed into this end of the shaft. Mounted on the central portion of the shaft 40 within the compartment 25 is a traction wheel 50 which preferably has a metal hub 51 and a resilient tire 52 adapted to engage against the lower surface of the flange 12 of the monorail 11. In other instances, however, it may be desirable to utilize a wheel made from other material and having no separate tire. The wheel 50 is connected for rotation with the shaft 40 by a key 53 and held axially in place by a set screw 54. When the wheel shaft 40 and the wheel 50 are rotated by means to be presently described, the wheel rolls along the monorail 11, thus causing the tractor 10 to travel therealong.

The wheel shaft mounting means, described above, can be readily installed in and disassembled from the housing 15 and for facilitating such assembly and disassembly, the walls 16 and 17 of the housing are provided with openings 55 which are aligned with the wheel shaft 40, these openings being normally closed by cover plates 56. To install the wheel 50 and its shaft 40, which has progressively larger steps or portions of increased diameter from its left-hand end toward a midpoint of the shaft, the following steps are carried out. The bearing 42 is first pressed onto the right-hand end 43 of the shaft 40. A sealing ring 42' is next slid over the left-hand end of the shaft 40 and into place against the left-hand end of the central enlarged portion 43' of the shaft, after which the ball bearing 41 is forced onto the shaft as shown in Fig. 3. A sub-assembly or shaft unit, comprising the shaft 40, the bearings 41 and 42, and the sealing ring 42', is thus formed.

Prior to inserting the shaft unit in the housing 15, the wheel 50 is lowered into the compartment 25. The shaft assembly, with its key 53 in place, is slid through the right-hand opening 55 and through the aligned holes in the walls 27 and 26 of the housing to mount the wheel, the shaft sealing ring 42' being forced into place in the bearing hole of the wall 26. A retainer ring 44' is next inserted through the left-hand opening 55 and slid onto the shaft 40 and secured against the boss of the wall 26 by screws. The retainer ring 57 is then secured against the boss of the wall 27, with shims (not shown) being employed to exert the proper force against the ball bearings to retain the shaft 40 axially in place.

The set screws 54 are next tightened to fasten the wheel 50 to the shaft 40. Following this step, the worm wheel 47 is inserted through the left-hand opening 55 and keyed to the left-hand end of the shaft 40 as shown in Fig. 3, the worm wheel being held in place by the cap screw 48 and a ring 48'. The cover plates 56 are finally secured in place to close the openings 55.

Extending between the pairs of flanges 38 and 39 are transverse pivot pins 58 and 59 to which respective arms 60 and 61 are pivotally connected. At their outer free ends, the four arms 60 and 61 carry respective wheels 62 and 63 which are adapted to engage and roll along the upper surface of the flange 12 of the monorail 11, the wheels being rotatable on studs 64 and preferably, although not necessarily, flanged as shown. The arms 60 and 61 carry adjusting screws 65 and 66 which are screwed thereinto and which have heads adapted to engage opposite sides of vertical webs 67 extending between the pairs of flanges 38 and 39. By unscrewing the adjusting screws 65 and 66, they are forced against the webs 67 so as to pivot the arms 60 and 61 downwardly. In this manner, the four wheels 62 and 63 are forced downwardly against the flange 12 of the track or rail 11 to support the tractor and the lower wheel 50 is, in effect, drawn upwardly against the lower side of the track 11 with the resilient tire 52 compressing thereagainst to effect maximum traction. Due to the positive engagement of the wheels 62, 63 and 50 against the opposite sides of the track flange 12, a highly efficient drive, free from slippage, is effected when the wheel 50 is rotated. Moreover, since the four wheels 62, 63 are adjustable independently of one another, by lowering or raising certain wheels, the tractor 10 may be readily leveled, both longitudinally and transversely.

The worm wheel 47 is adapted to be rotated by a worm 70 mounted on or formed integral with a countershaft 71 (Figs. 3 and 4) extending beneath and normal to the wheel shaft 40. One end 72 of the shaft 71 is reduced in diameter and is received within the inner race of a roller bearing 73 which is disposed within a recess 74 in the partition 20 of the housing 15. The other end of the shaft has a reduced portion 75 which is received in the inner race of a roller bearing 76 which abuts a shoulder of the shaft and which is disposed within a bore 77 in the end wall 19.

A retainer ring 77' is fastened to the wall 19 and engages the roller bearing 76 to retain the worm shaft assembly in place with the worm 70 meshing with the worm wheel 47. The shaft 71 projects outwardly from the wall 19 and carries a sprocket 78 by which the shaft is driven by means to be next described. It is to be noted that by the construction described above the countershaft 71 can be quickly installed in and removed from the housing 15 through the single bore 77 so that it is unnecessary to split the housing, that is, make the housing in separable parts for this purpose.

Figure 2:
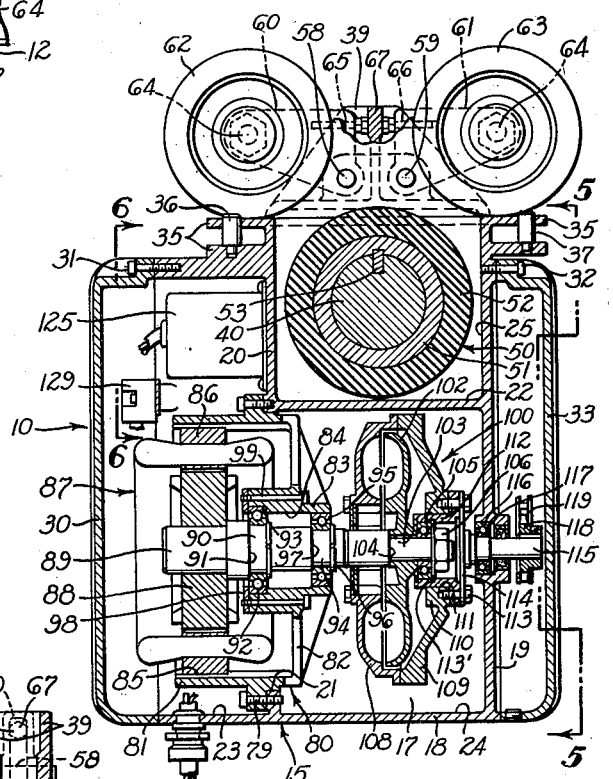
Fig. 2 is an enlarged longitudinal sectional view of the tractor.

Referring now to Fig. 2, the power means for driving the traction wheel 50 is located within the lower portion of the housing 15. Attached to the forward side of the partition 20 by screws 79 is a cup-shaped mounting member 80 having a peripheral wall 81 and a rear wall 82 having a central hub portion 83 provided with an axial bore 84. The inner surface of the wall 81 preferably has recessed, axially, extending bosses 85 for receiving the stator 86 of an electric motor 87 which is forced into the mounting member 80. The rotor 88 of the electric motor is pressed onto the forward end of a rotor shaft 89. Forced onto a portion 90 of the shaft and disposed against a shoulder 91 thereof is the inner race of a ball bearing 92, the outer race of the bearing being received in an annular recess or counterbore 93 in the forward end of the hub portion 83 of the mounting member 80. A reduced portion 94 of the shaft 89 is disposed within the inner race of a ball bearing 95 having its outer race disposed in the bore 84. A snap ring 96 is seated in a peripheral groove of the shaft 89 and engages the rearward side of the ball bearing 95 to maintain the latter against a shoulder 97 of the shaft. A retainer ring 98 secured to the forward face of the hub portion 83 by screws 99 retains the bearing 92 in the recess 93 so that axial movement of the shaft 89 is resisted.

The rotor shaft 89 is adapted to drive the worm shaft 71 through power transmission means to be next described. The power transmission means includes a fluid coupling, indicated generally at 100 in Fig. 2. The driving element or "runner" 102 of the fluid coupling 100 is keyed to the rearward end 103 of the rotor shaft 89 and held against a shoulder 104 of the shaft by a ball bearing 105 which is forced against the runner by a nut 106 screwed onto the rearward end of the shaft. The driven element or runner 108 of the fluid coupling is connected to a casing 109 which has a hub 110 provided with a bore 111. Disposed in the bore 111 is a sleeve 112 which receives the ball bearing 105, previously described, the sleeve being secured to the casing 109 by bolts 113. A snap ring 113' is disposed in an annular groove within the sleeve 112 and engages the face of the ball bearing 105. Also secured to the rearward end of the casing 109 by the bolts 113 is an end plate 114 which is secured one end of a drive shaft 115. The shaft 115 carries a ball bearing 116 which is disposed in a bore 117 in the end wall 19 of the housing 15. The shaft 115 projects rearwardly from the wall 19 to receive a sprocket 118 which is secured thereto. The sprocket 118 is adapted to drive the sprocket 78 by means of a chain 119. It is within the concept of this invention, however, to employ other means, such as a train of gears, for transmitting power from the shaft 115 to the shaft 71. In any event, the cover 33 is applied to the end of the housing 15 to enclose the driving means between the shafts 115 and 71.

It will be apparent from the foregoing description and by observing Fig. 2 of the drawings that the elements of the power transmission means, including the mounting member 80, the motor 87, the shaft 89, the fluid coupling 100, the drive shaft 115, and associated components, together provide a self-contained power unit which is adapted for convenient installation in and removal from the housing 15. It will also be observed that the power unit is insertable into the housing 15 through the open forward end thereof and that to mount the unit in the housing it is only necessary to guide the end of the drive shaft 115 through the bearing 116 and guide the rearward end of the mounting member 80 through the opening 21 in the partition 20 so as to position the flange of the member against the partition, after which the screws 79 are inserted and tightened to secure the unit in place. To remove the power unit from the housing, the reverse procedure is employed. It is important to note that by my improved construction in which the entire power unit is adapted for assembly outside the housing and is capable of being installed through an open end of the housing, it is unnecessary to provide a sectional housing having separable components requiring expert machining and fitting in order to obtain perfect alignment of the power transmission elements. It will also be apparent that by the present construction it is unnecessary to detachably connect the rotor 88 to the shaft 89 to permit assembly and disassembly of the parts, so that the possibility of the rotor loosening on the shaft is entirely avoided. This is an improvement over other power units wherein it is necessary to secure the rotor to the shaft by set screws or similar means which are apt to loosen and cause displacement of the rotor and damage to the power unit. The present construction is, therefore, an important improvement over prior tractors in which the electric motor and fluid coupling or clutch mechanism are installed separately in opposite directions or merely mounted on a platform of the tractor.

The power transmission means is assembled outside the housing 15 by first forcing the rotor 88 onto the left-hand end of the shaft 89, then sliding the retainer ring 98 into place on the shaft adjacent the rearward side of the rotor, after which the ball bearings 92 and 95 are pressed onto the shaft against the respective shoulders 91 and 97 and retained in place by split rings. The entire subassembly including the shaft 89, the rotor 88, the retainer ring 98 and the bearings 92 and 95, is inserted into the mounting member 80 through the open forward or left-hand end, as viewed in Fig. 2, the bearing 92 thus being disposed in the counterbore 93 while the bearing 95 is located in the bore 84. The screws 99 are then inserted and tightened to retain the subassembly in proper place.

The fluid coupling is assembled on the rearward or right-hand end 103 of the shaft 89 by mounting the components 108, 109 and 102 thereon with the latter component disposed against the shoulder 104. The sleeve 112, together with the ball bearing 105, is slid onto the end 103 of the shaft 89, the flanged end of the sleeve being disposed against the side of the element 109. By next screwing the nut 106 onto the threaded end of the shaft 89, the parts of the fluid coupling 100 are retained in place on the shaft. The ball bearing 116 is next forced onto the drive shaft 115 and the flanged end 114 of this shaft is connected, along with the sleeve 112, to the fluid coupling element 109 by means of the bolts 113.

The power transmission unit including the motor 87 and fluid coupling 100, carried by the mounting member 80, is conveniently assembled outside the housing 15 and may be readily installed within and removed from the housing. To install the transmission unit, it is merely inserted into the housing 15 through the forward open end thereof, in other words, in a right-hand direction as viewed in Fig. 2, the mounting member 80 being guided into the opening 21 of the partition 20 and the ball bearing 116 entering the bore 117 of the end wall 19 of the housing. To retain the transmission unit in place it is only necessary to apply the screws 79 so as to secure the peripheral flange of the mounting member 80 to the partition. Following the step of securing the transmission unit in the housing 15, the driving sprocket 118 and chain 119 may be operatively connected to the drive shaft 115, after which the cover members 33 and 30 may be applied to the housing to cover the sprockets 118 and 78 and the chain 119, and to close the forward end of the housing. It is to be noted at this point that when electric motors of different capacities are employed, mounting members of different dimensions may be substituted for the one shown in the drawings, and when the motor has a greater longitudinal dimension, a cover member 30 of greater width will also be substituted.

Assuming that the tractor 10 is in assembled condition and that it is mounted by the wheels 50, 62 and 63 for movement along the monorail 11, to effect travel of the tractor, the electric motor 87, which is of the reversible type, is energized to cause rotation of its rotor shaft 89 which rotates in the bearings 92, 95 and 105. Rotary movement is thus communicated to the driving runner 102 of the fluid coupling 100 and, through the medium of fluid interposed between the runner 102 and the runner 108, the latter is also rotated. Due to the fluid connection, slippage may occur between the runners at the start of rotation to avoid sudden starting of the tractor but as the drive continues slippage is reduced so that eventually the driven runner 108 and the drive shaft 115 are rotated at a speed which is only slightly less than that of the shaft 89.

The countershaft 71 is driven from the shaft 115 by means of the chain 119 and, through the medium of the worm 70 and worm wheel 47 the wheel shaft 40 and its traction wheel 50 are rotated, the direction of rotation of the wheel being in accordance with the direction of rotation of the rotor 88 of the reversible electric motor 87.

Figure 1:
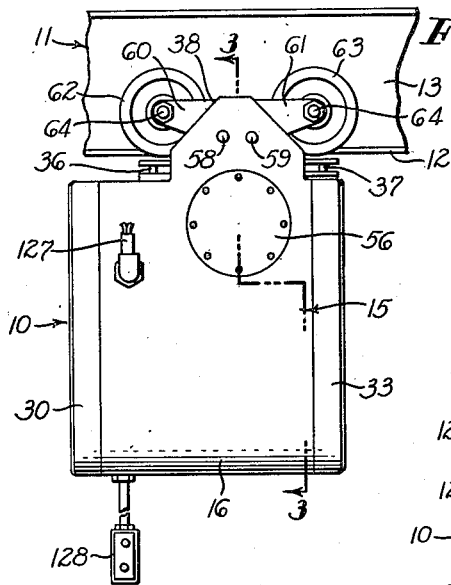
Fig. 1 is a front elevational view of my improved tractor, showing it arranged to travel along a monorail.

Means are embodied within the housing 15 for controlling the operation of the electric motor 87. Referring to Figs. 2 and 6, the control means includes a reversing starter 125 and a transformer 126 mounted on the partition 20 in the space located above the mounting member 80 so as to be readily accessible by merely removing the cover 30. Electric current for operating the motor 87 may be derived through a line 127 (Fig. 1) which may lead to any source of electric current, such as a trolley wire. A manually operable reversing switch 128 carried at the lower end of a conduit depending from the tractor 10 is employed for controlling the operation of the motor. By this arrangement, the push button control 128 can operate from a relatively low (110 v.) pilot circuit regardless of the voltage used for the motor (usually 220 or 440 v.). Leads are brought to a terminal block 129 so that during installation it is simply necessary to join the control wires to the appropriately marked terminals of the block and the power lines to their respective terminals to complete the assembly of the motor control means.

It will be apparent to one skilled in the art that various modifications might be made in the construction of the tractor which would fall within the spirit of this invention. Consequently, I do not wish to be limited in this respect, but desire to be afforded the full scope of the appended claims.

I claim as my invention:

1. A tractor adapted for movement along a track, comprising: a one-piece housing having a bottom wall, side walls, an end wall, a vertical partition in said housing provided with an opening, and an open end; wheel means carried by said housing and engaging opposite sides of the track to adapt said housing to travel therealong; and a power transmission means within said housing for driving at least one of said wheel means, said transmission means including a driving element, a fluid-actuated coupling for operating said element, an electric motor for actuating said coupling, said coupling having a drive shaft rotatable in said end wall, and a mounting member detachably secured to said partition within said opening thereof and supporting said motor, the portions of said transmission means between said partition and end wall being of less transverse dimensions than said opening whereby said transmission is insertable as a unit into said housing through said open end thereof.

2. A tractor adapted for movement along a track, comprising: a one-piece housing having a bottom wall, side walls, an end wall, a vertical partition in said housing provided with an opening, and an open end; wheel means carried by said housing and engaging opposite sides of the track to adapt said housing to travel therealong; and a power transmission means within said housing for driving at least one of said wheel means, said transmission means including a driving element, a fluid-actuated coupling for operating said element, an electric motor having a rotor shaft for actuating said coupling, said coupling having a drive shaft rotatable in said end wall, and a mounting member detachably secured to said partition within said opening thereof and supporting said motor, said mounting member having a bearing in which said rotor shaft is rotatable, the portions of said transmission means between said partition and end wall being of less transverse dimensions than said opening whereby said transmission is insertable as a unit into said housing through said open end thereof.

3. A tractor as defined in claim 1 in which said fluid-actuated coupling includes a first member and a second member adapted to be driven from said first member by fluid disposed therebetween, said first member being carried by said rotor shaft and said second member being carried by said drive shaft, said second member having an axial bearing in which an end of said rotor shaft is rotatable.

4. A tractor adapted for movement along a track, comprising: a one-piece housing having a bottom wall, side walls, an end wall, a vertical partition in said housing provided with an opening, and an open end; a bearing in said end wall; a fluid-actuated coupling disposed within said housing and including a first rotatable member and a second rotatable member adapted to be driven from said first member by fluid disposed therebetween, said second member having an axial drive shaft rotatable in said bearing and projecting from said end wall; wheel means rotatable on said housing and engageable with the track to adapt said housing to travel therealong; driving means operated by said drive shaft and operative to rotate said wheel means; a hollow mounting member detachably secured to said partition within said opening and having a bearing; and an electric motor having a stator supported within said mounting member and a rotor rotatable within said stator, said rotor having a shaft rotatable in said bearing of said mounting member in axial alignment with said drive shaft, said rotor shaft carrying said first member, and said mounting member, the portions of said motor and said fluid clutch between said partition and end wall being of less transverse dimensions than said opening whereby said transmission is insertable as a unit into said housing.

5. A tractor as defined in claim 4 in which said second rotatable member has an axial bore, and including: an annular element removably secured within said bore; and an anti-friction bearing disposed within said annular element in which an end of said rotor shaft is rotatable.

6. A tractor as defined in claim 4 and including: a cover member detachably secured to said housing and closing said open end thereof; and a cover member detachably secured to said end wall and enclosing said driving means.

7. A tractor as defined in claim 4 in which said driving means includes: a driven shaft rotatable on said housing and provided with a worm; power transmission means between said drive shaft and said driven shaft by which said driven shaft is rotated by said drive shaft; a wheel shaft carrying said wheel means; and a worm wheel on said wheel shaft in mesh with said worm.

AMBROSE MAZZOLA.

References Cited in the file of this patent

UNITED STATES PATENTS

| Number | Name | Date |
|---|---|---|
| 870,607 | Amberg | Nov. 12, 1907 |
| 1,199,359 | Fottinger | Sept. 26, 1916 |
| 2,038,732 | Guthrie | Apr. 28, 1936 |
| 2,162,688 | Lawrence | June 13, 1939 |
| 2,228,034 | Nelles | Jan. 7, 1941 |
| 2,322,785 | Knox | June 29, 1943 |

FOREIGN PATENTS

| Number | Country | Date |
|---|---|---|
| 106,443 | Germany | Oct. 15, 1898 |

OTHER REFERENCES

An article which appeared in the December 1941 issue of the "Mining Congress Journal" pages 30–34. A copy may be found in the Scientific Library of the Patent Office.